May 1, 1951     J. H. LANCOR, JR., ET AL     2,550,700
RADIO-OPTICAL TRACKING APPARATUS
Filed Aug. 19, 1943     4 Sheets-Sheet 1

INVENTORS
J. H. LANCOR, JR.
F. R. MARINDIN
BY R. D. McCOY
ATTORNEY.

Fig. 2.

Patented May 1, 1951

2,550,700

UNITED STATES PATENT OFFICE 2,550,700

RADIO-OPTICAL TRACKING APPARATUS

Joseph H. Lancor, Jr., East Williston, Frederick R. Marindin, Port Washington, and Rawley D. McCoy, Bronxville, N. Y., assignors to The Sperry Corporation, a corporation of Delaware Application August 19, 1943, Serial No. 499,216

24 Claims. (Cl. 343—117)

This invention relates generally to a combined radio and optical tracking system, and particularly concerns automatic and manual tracking control for a combined radio-optical sight to accurately track a target, such as an aircraft, and determine the angular position thereof.

A major object of the invention is to provide a combined radio-optical tracker in which the operator may optionally use a radio or optical sight for tracking a selected target.

Another object of the invention is to provide a searching and target selecting station for a sight in which the sight is positioned in one direction according to the displacement of a manually operable control member, and in a second direction at a rate corresponding to the displacement of said member.

A further object of the invention is to provide a tracking system in which a main sight may be rapidly slewed from one target to another according to the position of a remote controlling sight.

A further object of the invention is to provide an electrical tracking control for producing a variable ratio aided tracking signal to control a variable speed drive for positioning the sight.

A further object of the invention is to provide a tracking control in which a signal-producing element is automatically centralized when it is not being used to avoid introducing undesired rates when the element is switched into the tracking circuit.

A further object of the invention is to provide an improved electrical variable speed drive control system for controlling the output of the generator by a signal depending upon the torque of the motor.

A further object of the invention is to provide an improved electrical variable speed drive control system in which a generator is controlled by a signal dependent upon the rate of change of the motor's torque.

A further object of the invention is to provide an improved electrical variable speed drive control system in which a generator is controlled by a regenerative signal proportional to the torque of the motor and a degenerative signal dependent upon the rate of change of the motor's torque.

A still further object of the present invention is to provide an improved electrical variable speed drive control system in which a feedback circuit for controlling the generator includes a regenerative torque signal, a degenerative torque rate signal and a speed voltage stabilizing signal.

Other objects and advantages of the invention will become apparent from the following specification taken in connection with the accompanying drawings, wherein

Fig. 3A and 3B taken together form a schematic and wiring diagram of the complete tracking system shown in Fig. 1.

A continuation-in-part application of the present application, which was filed in the U.-S. Patent Office on May 10, 1945, Serial No. 593,049, in the name of Rawley D. McCoy and assigned to the assignee of the present application, matured into U. S. Patent No. 2,515,248, granted July 18, 1950. Patent No. 2,515,248 contains claims covering the motor control system disclosed herein in which torque, rate of change of torque and torque integral signals are employed.

According to the invention, the radio-optical tracker includes a radio sight and an optical sight movable synchronously in azimuth and elevation with their respective directivity and sighting axes substantially coincident. The radio sight includes a directional antenna and an indicator actuated by circuits connected to the directional antenna so that the indicator shows the position of a target relative to the directivity axis of the antenna. The indicator of the radio sight and the eyepiece for the optical sight are arranged adjacent a control handwheel for the tracker whereby the operator may optionally view either the indication of the target provided by the radio sight or the eyepiece of the optical sight in order to determine the direction in which the tracker should be moved to direct it toward the target.

A searching and target selecting station includes an indicator showing all targets detected by the radio sight and a control member movable in two directions for supplying signals to the variable speed drive in the tracker, whereby the tracker is positioned in elevation according to one directional movement of the control member and is driven in azimuth at a rate depending upon the other directional movement of the control member.

The handwheel on the tracker, which is manually operable with either the radio or optical sight, drives a generator, a potentiometer, and a variable load for the potentiometer, to produce a variable ratio aided tracking signal in which the ratio of the displacement signal to the rate signal decreases as the handwheel is turned. In order to avoid moving the tracker at undesired rates when control is transferred to the handwheel, a magnetic coupling automatically disconnects the potentiometer slider from the handwheel upon shutting off the power supply to the potentiometer; a centralizing device then becomes effective to move the potentiometer slider to a neutral position where it remains until the magnetic coupling is again energized and the handwheel operated to introduce a desired rate.

The electrical variable speed drive for moving the tracker, including a generator for controlling the speed of a motor, has an impedance connected in series with the motor armature. The voltage across this impedance, which depends upon the torque of the motor, is used to provide a degenerative differentiated feedback signal and a regenerative feedback signal, together with a speed stabilizing feedback signal for controlling the generator output. This arrangement produces an improved speed regulation of the motor which is desirable for accurate tracking, particularly at low speeds for varying load conditions.

Automatic tracking is accomplished by circuits connected to the radio sight for supplying azimuth and elevation error signals to the variable speed drive which moves the directivity and sighting axes of the tracker toward the target. A remote sight may be positioned at any time toward a different target than that which is being tracked by the radio-optical tracker. Upon actuation of a switch on the remote sight, the tracker is slewed rapidly, by signals actuating the variable speed drive, to the position of the remote sight.

*Tracking system*

Figure 1:
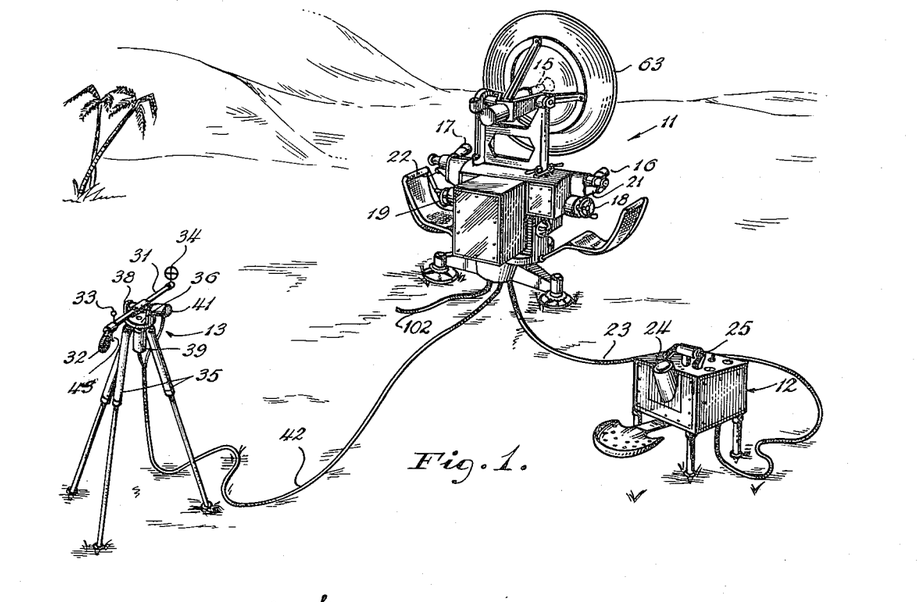
Fig. 1 is a perspective view of a complete tracking system embodying the invention and showing a radio-optical tracker, a searcher and target selecting station, and a remote sight.

A combined radio-optical tracking system embodying the invention is shown in Fig. 1, including a radio-optical tracker designated generally at 11, a radio searching and target selecting station 12, and a remote sight 13. The radio-optical tracker includes a directional antenna 15 and an optical sighting system having azimuth and elevation telescopes 16 and 17, the sighting axes of which are arranged substantially coincident with the directivity axis of the antenna 15. As will hereinafter be described in more detail, operators may turn handwheels 18 and 19 to synchronously position the antenna 15 and telescopes 16 and 17 in azimuth and elevation. Radio sighting indicators 21 and 22 are arranged adjacent each of the telescopes 16 and 17, and may be used at the option of the operator.

The remote searching and target selecting station 12 is connected by cable 23 to the tracker 11 and has a radio indicator 24 for indicating the position of all targets detected by the radio detecting and ranging system connected to the antenna 15. Handlebar controls 25, movable about two independent axes, are connected to electrical circuits to remotely control the position of tracker 11. Movement of the handlebar controls 25 about a horizontal axis positions the tracker 11 in elevation so the vertical position of the tracker 11 corresponds to the position of the handlebar controls 25. Movement of handlebar controls 25 about a vertical axis introduces a signal which causes the tracker to turn in azimuth at a rate dependent upon the position of handlebar controls.

The operator at the searching and target selecting station views the indicator 24 and operates handlebar controls 25 to scan the antenna 15 over a portion of space. When energy reflected from a target is received by the antenna, an indication appears on the screen of the indicator 24 corresponding to the position of the target relative to the antenna 15. The operator may then adjust handlebar controls 25 to move the directivity axis of the antenna 15 in line with the target. If the indicator shows two or more targets, the operator of the searching and target selecting station may direct the tracker toward a selected one of the targets.

Once the operator of the searching and target selecting station has selected a particular target, he turns control of the tracker over to the operators on the tracker itself. These operators adjust handwheels 18 and 19 to keep the directivity axis of the antenna 15, as well as the sighting axis of the optical sights 16 and 17, continuously on the target. If desired, this step may be accomplished automatically by connecting suitable radio sensing circuits to operate the tracker, causing it to automatically follow movements of the target.

The remote sight 13 is provided for use of a fire control officer who may wish to quickly transfer the tracker from one target to another for attack or other reasons. In order to accomplish this, the fire control officer adjusts sight 31 as by handle grip 32, so the line of sight determined by members 33 and 34 is on the desired target. The sight 31 is mounted on a tripod having legs 35 which carry a plate 36 rotatable on the tripod. The sight 31 is rotatably mounted in a bracket 38 on plate 36 for movement in elevation. Azimuth and elevation movements of the sight 31 adjust the position of signal generators or synchronous rotary transformers 39, 41, which may be of any suitable conventional type such as a "Selsyn" or "Telegon," and are connected through cable 42 to the tracker. Signals from the rotary transformers 39, 41 become effective upon closing a switch by operation of trigger 43 to move the tracker 11 to a position corresponding to that of the sight 31. Thus, the fire control officer may at any time direct his sight 31 on to a new target and by operating trigger 43 transfer the tracker 11 to the desired target.

*Radio-optical tracker*

Figure 2:
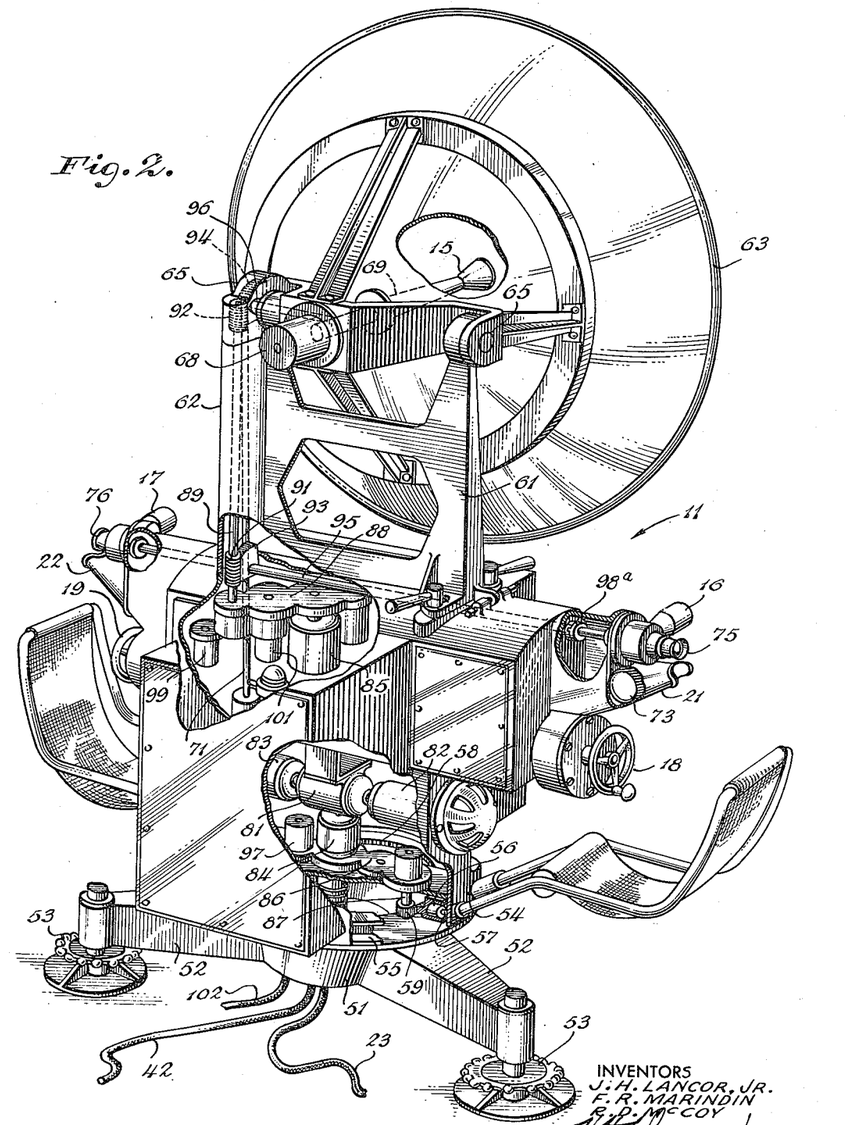
Fig. 2 is an enlarged perspective view of the radio-optical tracker shown in Fig. 1 with some parts broken away to more clearly show driving and control mechanism within the tracker.

The radio-optical tracker 11 is shown in more detail in Fig. 2 wherein some portions are broken away to more clearly show arrangements of the driving mechanisms used. The radio-optical tracker 11 is mounted on a base 51 having legs 52, 52 projecting radially from the base and carrying adjustable foot members 53, 53 for purposes of levelling the tracker. A main housing or support 54 is mounted on the base 51 for rotation about the vertical axis. A track 55 on the base 51 is adapted to receive a plurality of rollers 56, attached by shafts 57 to the support 54, whereby the support is secured to the base but is rotatable thereon. A ring gear 58 is formed on the internal portion of the track 55 and has a pinion 59 meshing therewith to drive the support 54 about the vertical axis.

A pair of columns 61 and 62 extend above the support 54 to carry bearings 65 for rotatably supporting the antenna 15 together with its parabolic reflector or parabola 63 for movement about a horizontal axis in elevation. The parabolic reflector 63 is designed to provide a directional beam pattern for the antenna 15. The axis of this beam pattern is offset slightly relative to the axis of the parabola. This offset may be obtained by either mechanically or electrically displacing the center of radiation from the focal point of the antenna. The arrangement shown in the drawings has a mechanically balanced, but electrically unbalanced antenna. The antenna 15 is rotated as by a motor 68 about the axis of the parabola 63. This rotation causes the axis of the beam pattern to generate a cone as it moves around the parabola's axis. The motor rotates the antenna continuously, so energy is radiated in a conical pattern having its directivity axis coincident with the axis of the cone.

The antenna 15 is connected through suitable coaxial cables and couplings such as those shown at 69 and 71 to radio transmitting and receiving circuits within the housing of the tracker. The radio receiving circuits are connected to suitable sensing circuits to determine the position of the target relative to the directivity axis of the antenna. Signals produced by these circuits actuate the cathode ray tubes having screens 73 which form indicators 21 and 22, which may be viewed by the operators in adjusting the handwheels 18 and 19 to keep the tracker on the target. The azimuth and elevation telescopes 16 and 17 have eye-pieces 75 and 76 arranged adjacent the indicators 21 and 22 whereby the operators of handwheels 18 and 19 may optionally use either the radio or optical sighting systems for tracking the target. Since the telescopes 16 and 17 and the antenna 15 are all mounted on the support 54, they rotate as a unit in azimuth.

The radio optical tracker may be controlled by any suitable variable speed drives for adjusting it in azimuth and elevation. In the present case electrical variable speed drives are used for moving the tracker in both azimuth and elevation. For this purpose, a constant speed motor 81 drives generators 82 and 83, the outputs of which are used to control the speed of azimuth and elevation driving motors 84 and 85 respectively. The azimuth motor 84 drives through suitable gearing within gear box 86 to rotate shaft 87 which carries the pinion 59. Thus actuation of the motor 84 acts to drive the entire radio-optical tracker in azimuth.

The elevation driving motor 85 operates through gearing within gear box 88 to rotate shaft 89 in the column 62. The shaft 89 carries a pair of worms gears 91 and 92 which mesh with worm wheel sectors 93 and 94 to rotate shafts 95 and 96 respectively. Shaft 95 is connected through a suitable coupling 98a to turn the telescopes 16 and 17 about the horizontal axis of the shaft 95, that is, to adjust the telescopes 16 and 17 in elevation. Shaft 96 rotates the parabola 63 and antenna 15 in elevation synchronously with movement of the telescopes 16 and 17, thereby maintaining the directivity axis of the antenna 15 substantially coincident with the sighting axes of the telescopes 16 and 17 for all elevation positions of the radio-optical tracker.

The outputs of the generators 82 and 83 are controlled by the movements of handwheels 18 and 19 to actuate motors 84 and 85 for driving the radio-optical tracker in azimuth and elevation. Thus a single control is provided for each of the azimuth and elevation trackers, whether he is using the radio or optical sighting system. When desired, the generators 82 and 83 may be controlled automatically in accordance with signals from the radio sighting system to drive the antenna 15 in a manner which continuously directs it toward a selected target.

The main purpose for a tracker of this type is of course to determine the angular position of a target in order to position the guns to accurately fire at the target. When the tracker is on the target, its position represents the azimuth and elevation angular position of the target. This position may be transmitted by a suitable position transmitter which may be of any conventional type. Position transmitters 97 and 98 are driven by the motor 84 through suitable gearing within the gear box 86. Similar position transmitters 99 and 101 are driven by the motor 85. These position transmitters 97, 98, 99, and 101 provide data corresponding to the azimuth and elevation angular position of the radio-optical tracker. This data represents the angular position of the object being tracked and may be supplied as by cable 102 to suitable gun directing apparatus.

The radio detecting system may, if desired, also be used to determine the range of the target in a conventional manner wherein the time interval between the radiation and reception of reflected pulses is measured to ascertain the range of a target. However, the ranging system does not form a part of the present invention, so further description herein is deemed unnecessary.

Figure 3A:
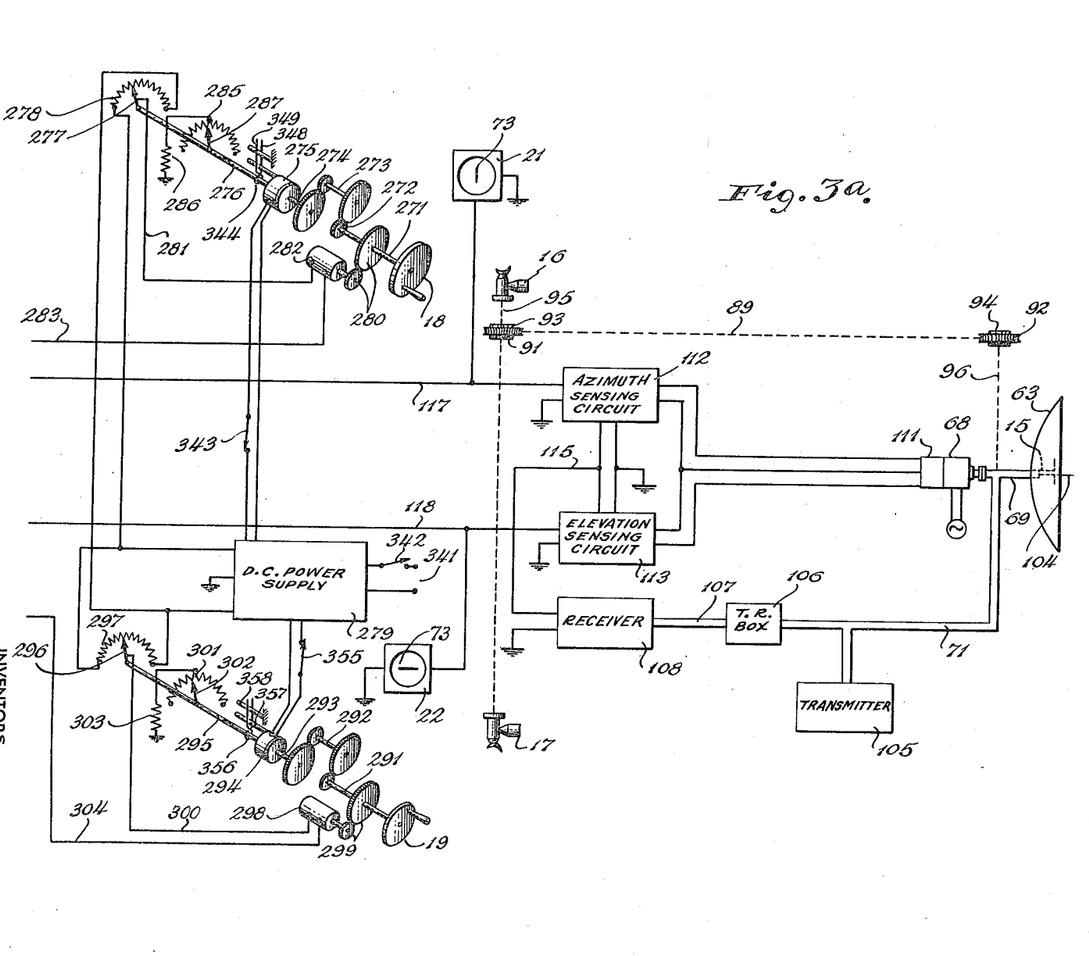

The details of the various controls and indicating circuits are shown schematically in Figs. 3a and 3b of the drawings. In Fig. 3a the radio sighting system, including antenna 15 with its parabola 63 and its connecting coaxial cables 69 and 71, is shown as rotated by the motor 68. The directivity axis of the antenna 15 is adjustable in elevation by the shaft 96 carrying worm wheel sector 94 that is driven by worm 92 synchronously with the elevation adjustment of the telescopes 16 and 17 by shaft 95, which is driven by worm gear 91 and sector 93.

As was outlined above, the antenna 15 is either electrically or mechanically unbalanced with respect to the axis of the parabola 63 to produce an actual beam pattern that is offset relative to the axis of the parabolic reflector 63. The antenna is continuously rotated about a spin axis 104 that is coincident with the axis of the parabola. Since the beam pattern is offset relative to the spin axis, rotation of the antenna by motor 68 causes the beam pattern to rotate about the spin axis and thereby generate a cone.

Radiant energy is supplied to the antenna 15 from a transmitter 105 through the coaxial cables 71 and 69. Energy reflected by a target is absorbed by the antenna and supplied by the same coaxial cables to a TR box 106, which acts as a limiter for blocking the relatively high power transmitted pulses of energy but adapted to pass the weaker reflected pulses which are absorbed by the antenna. The TR box 106 is connected by suitable transmission device such as coaxial cable 107 to a receiver 108, which produces a pulse output when reflected energy is received by the antenna 15.

As is well known in systems of this type, the strength of received energy depends upon the position of the source of energy relative to the axis of the beam pattern. Since the beam pattern is rotating in a conical path, the energy from a source (energy reflected by an object) varies in strength as the beam pattern moves. Thus, the envelope of the reflected energy received by the antenna varies in amplitude at a frequency corresponding to the spinning frequency of the antenna. The amplitude of these variations depends upon the amount of displacement of the object relative to the directivity axis, that is, the spin axis 104 of the antenna. The phase relation of these variations depends upon the direction of the displacement of the object relative to the directivity or spin axis 104.

A two-phase generator 111, having its windings displaced electrically by 90°, is driven by the motor 68 and develops voltages corresponding to lateral and vertical components of the direction in which the beam pattern is displaced relative to the spin axis at any instant. The phase of these voltages is compared with the phase of variations in the envelope of received energy in azimuth and elevation sensing circuits 112 and 113 to determine lateral and vertical components of the displacement of the detected object relative to the directivity axis of the antenna. The azimuth and elevation sensing circuits 112 and 113 are connected to receiver 108 by lead 115 and provide azimuth and elevation error signals depending upon the phase displacement between the received energy envelope and the voltages of two-phase generator 111.

These signals are transmitted by leads 117 and 118 to azimuth and elevation indicators 21 and 22, which are composed of cathode ray tubes having screens 73. The indicators 21 and 22 have circuits for producing a trace on the screens 73 corresponding to the azimuth and elevation error signals which represent the displacement of the target relative to the spin axis 104. Operators may adjust the position of handwheels 18 and 19 to direct the radio-optical tracker toward the target by using either the optical sights 16 and 17 or radio sight indicators 21 and 22.

The leads 117 and 118 are also connected to the indicator 24 in the searching and target selecting station. The indicator 24 (Fig. 3b) includes circuits for combining signals from the azimuth and elevation sensing circuits to produce a trace on screen 120 of the cathode ray tube representing the azimuth and elevation displacement of the target relative to the spin or directivity axis of the antenna 15.

*Tracking motor controls*

Azimuth and elevation variable speed driving mechanisms are controlled by signals from the radio sight, the handwheels on the radio-optical tracker, the handlebar controls on the searching and target selecting station, or the position of the remote sight to drive the tracker in azimuth and elevation at a rate proportional to the voltage of the signals supplied. Suitable switching for selecting the desired signal is provided and will subsequently be described in detail.

Azimuth and elevation amplifiers 121 and 122 are supplied with tracking signals by leads 123 and 124 to remotely operated control switches 125 and 126 respectively. Since the azimuth and elevation amplifiers 121 and 122 are identical, a description of one will suffice for both. Corresponding reference numerals are therefore applied to similar elements of both amplifiers.

The azimuth amplifier 121 consists of a differential amplifier stage including tubes 128 and 129 arranged to produce a balanced output which is supplied to an output stage including tubes 131 and 132 which control the current in field windings 133 and 134 of the generator 82, the output of which controls the azimuth driving motor 84.

An input voltage supplied by lead 123 is connected to grid 135 of tube 129 and a correspondingly amplified voltage appears across the load resistor 136 connected to plate 137 of tube 129. Plate 137 and screen grid 138 are connected to terminals of a suitable power supply 141. Cathode 142 of tube 129 is connected through cathode resistor 143 to a source 144 of negative potential in order that the voltage of plate 137 will be in the neighborhood of ground potential.

Tube 128 has its cathode 145 connected to the cathode 142 and its plate 146 connected through load resistor 147 to the positive supply source 141. Similarly, the screen grid 148 of tube 128 is connected with the screen 138 of the tube 129 and to the source 141. When a signal is supplied by lead 123 to grid 135, an amplified signal of opposite phase appears across load resistor 136 and is supplied by lead 151 to grid 152 of tube 132. The variation in current through the tube 129 caused by the signal on grid 135 varies the drop of cathode resistor 143, which in turn changes the bias of tube 128, producing an amplified voltage across load resistor 147, having the same phase as the signal voltage appearing on lead 123. The phase of the voltage across load resistor 147 is therefore opposite to the voltage of lead 151 and is supplied by lead 153 to grid 154 of the tube 131.

This balanced output of the first stage varies the current in tubes 131 and 132 of the second stage in accordance with the polarity and magnitude of tracking signals appearing on lead 123. Cathodes 155 and 156 of tubes 131 and 132 are connected through a suitable cathode resistor 157 to ground. Screen grids 161 and 162 are connected in the usual manner to a source 163 of positive potential. Plates 165 and 166 of tubes 131 and 132 are connected through opposite halves 133 and 134 of the field winding for generator 82 to a source 168 of positive potential.

The balanced output of the first stage of the amplifier is applied to grids 152 and 154 of tubes 132 and 131, changing the current through the tubes and therefore through the two halves 133 and 134 of the field winding of the generator 82 to produce a resultant field having a polarity and strength corresponding to the direction and magnitude of the tracking signal applied by lead 123. In view of the high gain of the amplifier, condensers 169 and 171 are connected across the two halves of the field winding in order to prevent oscillations in the amplifier and to by-pass alternating components in the current through the tubes 131 and 132.

As previously explained, the constant speed motor 81 drives armature 172 of the generator 82. As the field of windings 133 and 134 is changed in direction and magnitude by the tracking signal applied by lead 123, the output voltage of the generator 82 as represented by leads 175 and 176 is varied accordingly. This voltage is applied to the terminals of armature 177 of the motor 84, which has a field 178 energized from a power supply 179. In accordance with well-known electrical principles, armature 177 of motor 84 is driven at a rate depending upon the voltage applied to its terminals. Hence, the motor 84 drives shaft 87 in a direction and at a rate depending upon the polarity and magnitude of the tracking voltage signal applied by lead 123. The shaft 87 drives through the pinion 59 which meshes with the ring gear 58 to rotate the entire radio-optical tracker support in azimuth on the base 51.

In order to stabilize the operation of the amplifier and variable speed drive, a voltage proportional to the velocity of the motor 84 is generated by permanent magnet generator 181 driven by the shaft 87. This voltage is supplied by lead 182 to grid 183 of the tube 128. The polarity of lead 182 is selected so it will act in a degenerative sense upon the output of the amplifier. An amplified voltage appears across load resistor 147 in the plate circuit of tube 128 corresponding to the voltage applied to grid 183. Variations in the current in tube 128 due to the voltage applied to grid 183 cause changes in the voltage drop across cathode resistor 143, thereby changing the bias of tube 129 and causing a correspondingly amplified voltage to appear across load resistor 136.

The circuits thus far described produce a balanced output voltage on leads 151 and 153, having components corresponding to the tracking signal voltage and to the velocity of motor 84. The inverse feedback of a speed voltage in this fashion is frequently referred to as velocity damping in that it acts through the amplifier to oppose changes in the speed of the motor 84.

Although the velocity damping voltage tends to stabilize the operation of the variable speed mechanisms, it introduces other factors which tend toward instability. As is well known, an inverse feedback system will oscillate at a frequency where a phase shift of approximately 180° occurs in the system so the feedback becomes regenerative instead of degenerative. One arrangement for avoiding this difficulty is to provide some means for attenuating the gain of the circuit at the frequency where oscillation would occur. Since the present feedback system includes a mechanical link in the form of a motor 84, it is possible to effect this attenuation by introducing another degenerative signal into the amplifier depending upon the rate of change of the motor's torque. Such an arrangement tends to oppose changes in the torque of the motor and hence substantially attenuate the gain of the circuit at the frequency at which oscillation would otherwise occur.

A voltage corresponding to the torque of the motor may be obtained by placing an impedance such as resistor 191 in series with the circuit of armatures 172 and 177. Since the current drawn by motor 84 depends upon its torque, the current in the circuit of armatures 172 and 177 likewise depends upon the torque of the motor. Hence, the voltage drop across the impedance 191 is proportional to the torque of the motor 84. This impedance should preferably be small as compared with the resistance of the armatures 172 and 177 in order to avoid an undesirable drop in the circuit.

The voltage across impedance 191 is connected by leads 192 and 193 across a series circuit including a fixed resistor 194 and a resistor 195 having a sliding tap 196 connected to ground. The voltages between leads 192 and 193 and ground are therefore of opposite polarity, but both depend upon the torque of the motor 84. The ratio of the two voltges is determined by the position of the ground tap slider 196 on resistor 195.

The lead 192 from one side of the impedance 191 is connected through a resistor 197 to lead 198. Lead 193 from the opposite side of the impedance is connected through condenser 199 to the lead 198. The voltage of lead 193 is differentiated by the resistance condenser network 197, 199 so it corresponds to the rate of change of the torque of the motor.

This differentiated voltage appearing on lead 198 is connected in series with the velocity damping voltage of generator 181 and fed back in a degenerative sense to the amplifier 121 by lead 182. The degenerative or inverse feedback of a voltage depending upon the motor's torque rate attenuates the gain of the circuit at the frequency at which it would oscillate, that is, the frequency at which the phase shift would be 180° and the inverse feedback circuit would become a regenerative feedback circuit.

One difficulty frequently encountered in this type of electrical variable speed driving mechanisms is that the speed regulation of the motor is poor at low speeds. When the torque is increased at low speeds, the speed of the motor is reduced due to the voltage drops in the armature circuits of the motor and generator as well as the effects of armature reaction and other losses. In tracking system of the character herein described, it is desirable to have the speed dependent upon the voltage supplied and substantially independent of the torque of the motor.

Systems for overcoming this difficulty have heretofore been proposed in which the motor or the generator are provided with compound fields. However, in order to accomplish the desired result for tracking systems it is necessary to overcompound the fields, which tends toward instability. It has also been proposed to utilize the voltage across the armatures of the motor and generator, which has components including the generated voltage and the drop in the armature windings, as a regenerative feedback voltage for the amplifying circuit to increase the field strength of the generator with an increase in motor torque.

The voltage across the armatures also includes spurious signal components from the commutator which must be filtered in order to provide a useful voltage that is dependent upon torque. A filter for this purpose must have a long-time constant in order to block the spurious higher frequency signals. Such a time constant reduces the response rate of the circuit for all signals which is also undesirable.

According to the present invention, a portion of the voltage across impedance 191, which is proportional to the torque of the motor, is supplied by a regenerative feedback circuit to the amplifier 121, thereby increasing the field strength of the generator 82 as the torque of the motor 84 increases. Since the voltage between lead 192 and ground is proportional to the torque of the motor, it provides a regenerative feedback voltage proportional to torque. Since leads 192 and 193 are of opposite polarity with respect to ground, they may be used so the torque feedback voltage of lead 192 is regenerative, whereas the torque rate voltage derived from lead 193 is degenerative. It will be apparent, therefore, that the feedback lead 182 to grid 183 of the tube 128 has a regenerative component dependent upon the motor torque and degenerative components dependent upon the rate of change of the motor's torque. It has been found that only a small regenerative torque voltage is necessary in order to maintain the desired speed regulation of the motor; hence the position of ground tap slider 196 is selected whereby the voltage of lead 192 is comparatively small.

The elevation amplifier 122, as previously stated, is identical with the azimuth amplifier 121. Tracking voltage signals from the elevation sensing circuit 113, handwheel 19, the searching and target selecting station, or the remote sight, are supplied through switch 126 to lead 124 and thence to grid 135' of tube 129'. The amplifier 122 controls the current through windings 201 and 202 of the elevation geneartor 83 to vary the voltage appearing across armature 203 according to the polarity and magnitude of the tracking voltage applied by lead 124. The armature 203 is connected by leads 204 and 205 to armature 206 of the motor 85. The field winding 207 of the motor 85 is also connected to the power supply 179.

The motor 85 drives shaft 89 which acts through worm gears 91, 92 and sectors 93, 94 to position and radio and optical sights in elevation at a rate dependent upon the voltage applied to lead 124.

Impedance 208 is connected in the circuit of armatures 203 and 206 for producing torque and torque rate component voltages at lead 209. This lead is connected in series with permanent magnet velocity damping voltage generator 211 to lead 213, which forms the feedback lead for the amplifier 122 and is connected to grid 183' of tube 128'. The circuit for obtaining regenerative torque voltage and the degenerative torque rate voltage is the same as that already described in connection with the azimuth variable speed drive, and corresponding elements have been given the same reference numerals. The lead 213, therefore, corresponds to the azimuth feedback lead 182 and includes degenerative feedback voltages proportional to the velocity and rate of change of torque of the motor and a regenerative voltage dependent upon the torque of the motor.

Both of the variable speed circuits and motors are stable and rotate an output member at a velocity proportional to the voltage of an applied tracking signal. Stabilization of the system is provided by inverse feedback of velocity damping and torque rate voltages. Substantially constant speed regulation at low speeds for varying torque is provided by a regenerative feedback circuit of a voltage proportional to the torque of the motor.

The output shaft 87 of the azimuth motor 84 drives through gearing train 221 to position rotor winding 222 of a fine position transmitter 98, which is energized from a suitable alternating current source 223. Reduction gearing 224 is also actuated to position rotor winding 225 of the coarse position transmitter 97, which is energized from a source 226. The position of windings 222 and 225 induces signals in stator windings 227 and 228 of the transmitters 98 and 97 which correspond to fine and coarse signals of the azimuth position of the radio-optical tracker.

Similarly the elevation tracking motor 85 drives through gearing 231 to position rotor winding 232 of fine position transmitter 101, which is energized from a suitable source of alternating current 233. Additional reduction gearing 234 drives shaft 235 which positions rotor winding 235 of coarse transmitter 99 in accordance with the elevation position of the radio-optical tracker. The rotor winding 236 is also energized from a suitable source 237 of alternating current voltage. Voltages are induced in stator windings 238 and 239 of the fine and coarse transmitters 101 and 99 corresponding to fine and coarse signals of the elevation angular position of the radio-optical tracker.

The azimuth and elevation signals produced by the position transmitters just described correspond to the angular position of the tracker which, when the tracker is on the target, is identical with the azimuth and elevation angular position of the target.

*Searching and target selecting station*

As shown in Figs. 1 and 3b, a remote searching and target selecting station 12 is provided with a remote indicator 24 in the form of a cathode ray tube having a screen 120 actuated in response to reception of reflected energy by the antenna 15 to indicate the position of a target relative to the directivity axis of the antenna. Handlebar controls 25 may be adjusted by the operator to scan the directivity axis of the antenna 15 over a portion of space in order to pick up targets that may be present.

As indications of the targets appear on the screen 120 of the indicator 24, the operator may further adjust the handlebar controls 25 to select a particular one of several targets appearing on the indicator. It has been found that the most convenient manner for the operator of the searching and target selecting station to handle the controls is to provide displacement tracking in elevation and rate tracking in azimuth. Thus, the antenna 15 is displaced in elevation an amount corresponding to the displacement of the handlebar controls about a horizontal axis, and is rotated in azimuth at a rate depending upon the displacement of the handlebar controls about a vertical axis.

As the handlebar controls 25 are moved about a vertical axis, they rotate pinion 241, which turns gearing 242 of shaft 243 to position slider 244 of potentiometer 245, which is connected to suitable voltage supply 246. The voltage of the potentiometer slider therefore depends upon the displacement of handlebar controls about a vertical axis. This voltage is applied by lead 248 to switch 249 and is connected through switches 251 and 125 to lead 123 of amplifier 121. Hence, the azimuth motor 84 drives the tracker in azimuth at a rate proportional to the voltage of potentiometer slider 244, which is determined by the angular displacement of the handlebar controls about a vertical axis.

As the handlebars 25 are moved about a horizontal axis, they act through pinion 253 and rack 254 to translate shaft 255 which acts through circular rack 256 and pinion 257 to position rotor winding 258 of a rotary transformer or other signal generator which has stator winding 259 connected to the stator winding 239 of the coarse elevation position transmitter 99. As previously described, the voltages induced in the stator winding 239 of the coarse elevation transmitter correspond to the elevation position of the tracker. These signals are transmitted to stator winding 259 of the signal generator which induces a voltage in rotor winding 258 corresponding in phase to the displacement between the rotor winding 258 and rotor winding 236 of the transmitter.

This signal is supplied by leads 261 and 262 to an elevation phase detector 263 which compares the phase of the voltage of winding 258 with that of source 264, synchronized with the source 237. The elevation phase detector produces an output error voltage of a polarity and magnitude corresponding to the direction and magnitude of the displacement between the rotor windings 236 and 258.

This error voltage is connected by lead 267 through switches 268 and 269 to switch 126 where it is supplied by lead 124 to the elevation amplifier 122. The elevation tracking motor 85 is then driven at a rate and in a direction determined by the displacement between the handlebar controls and the tracker. The motor is driven until it causes the angular position of transmitter winding 236 to correspond with that of the signal generator winding 258, at which time the tracker will be displaced in elevation in an amount corresponding to the displacement of the handlebar controls about a horizontal axis.

In the manner described, the radio-optical tracker is moved in azimuth at a rate dependent upon the displacement of the handlebar controls about a vertical axis and is displaced in elevation an amount corresponding to the elevation displacement of the handlebar controls. With this arrangement, it is not necessary for the operator to utilize care to avoid setting in undesired elevation rates. He may quickly position the tracker at the desired elevation by merely displacing the handlebar controls and then set in such an azimuth rate as may be necessary to follow movements of the target.

Since the vertical component of the target's velocity is usually small compared with its horizontal components, the operator may more readily track vertically with displacement tracking than with rate tracking. The combination of elevation displacement tracking and azimuth rate tracking furthermore provides the operator at all times with an indication of approximate elevation angle of the target.

In order to have the radio optical tracker search a portion of space, an azimuth rate can be set in by moving handlebar controls 25 to the desired point and, by moving the handlebar controls up and down slowly, oscillation of the antenna in elevation will result. If desired, this oscillatory movement of the tracker in elevation may be made automatic as by stepping the handlebar controls up and down as by a ratchet mechanism or by moving the rotor winding 258 back and forth by a motor.

*Manual tracking system*

Handwheels 18 and 19 are turned by azimuth and elevation operators to keep the radio-optical tracker on the target either through use of optical telescopes 16 and 17 or the indicators 21 and 22 of the radio sight. The indicators 21 and 22 provide on their screens 73 an indication of the azimuth and elevation displacements of the directivity axis of antenna 15, relative to the position of the target. This is a similar indication to that obtained by the operators in using the optical sights in that it corresponds to the visual error signal of the displacement of the target from the vertical or horizontal cross hairs or other reticle.

It has been found in practice that an operator may most conveniently track movements of the target by the use of aided tracking in which the sight is displaced an amount and at a rate dependent upon the displacement of his tracking control member. For distant targets which have a relatively low angular velocity, tracking may be most readily accomplished with apparatus which provides either pure displacement tracking or a high ratio of displacement to rate tracking. This is referred to by those versed in the art as an aided tracking system having a high time constant. As the target comes nearer and its angular velocity increases, it is desirable to increase the relative amount of rate tracking, that is, to reduce the ratio of displacement to rate tracking or to decrease the time constant of the aided tracking system. It will be apparent therefore that the time constant of an aided tracking system preferably decreases as the angular velocity of the target increases. The present invention provides an electrical variable ratio aided tracking system in which the time constant of the aided tracking system decreases as the operator displaces the handwheel from its central neutral position.

Since the tracking motors drive the tracker at a rate dependent upon the voltage of the tracking signal, rate tracking is obtained by producing a voltage dependent upon the displacement of the handwheel, whereas the displacement tracking is introduced by a voltage which is the derivative of the handwheel movement, that is, a voltage proportional to the rate of movement of the handwheel.

As shown in Fig. 3a, azimuth tracking handwheel 18 drives a shaft 271 and pinion 272, which operates through gearing 273 to rotate shaft 274. The shaft 274 is connected by a magnetic coupling 275 to a shaft 276 that rotates a slider 277 of potentiometer 278, which has its terminals connected to a regulated direct current power source 279.

Potentiometer slider 277, the voltage of which is determined by positioning handwheel 18, is connected by lead 281 in series with a permanent magnet generator 282 that is driven by gearing 280 to produce a voltage proportional to the rate of movement of the handwheel 18. Thus, the voltage output of tracking control as represented by lead 283 includes an aided tracking signal having a displacement component from potentiometer slider 277 and a rate component from generator 282.

The system thus far described provides an aided tracking system having a non-variable time constant. In order to vary the time constant inversely with the displacement of the handwheel, it is necessary to increase the relative magnitude of the rate tracking signal from potentiometer slider 277 as the displacement of the handwheel 18 is increasing. This is accomplished by providing a variable load for the potentiometer 277 which is controlled by the handwheel 18 to increase the resistance of the load as the displacement of the handwheel increases, thereby reducing the relative effectiveness of the IR drop in the potentiometer and increasing its output voltage in a non-linear fashion.

A variable load in the form of variable resistor 285 has its center point connected through resistor 286 to ground and its slider 287 connected to the potentiometer slider 277 through the shaft 276. Since the center point of the power supply 279 is grounded, the voltage output of potentiometer 278 is zero when the slider is in its central neutral position, corresponding to the neutral position of handwheel 18. When in this neutral position the slider 287 of the variable load resistor 285 is also centralized, so the load on the potentiometer 278 is a maximum and depends solely on resistor 286 in parallel with the amplifier 121 which, of course, has a very high input resistance.

When the slider 277 is first displaced from its neutral position, the voltage of the slider is comparatively low. However, the resistance of the load is also low, so the current drawn by the load is relatively high. As the slider is further displaced, its voltage normally increases, but since the resistance of the load is also increased by movement of slider 287 along variable resistor 285, the drop in the potentiometer is correspondingly reduced in non-linear fashion. Thus, the actual output voltage of the potentiometer slider 277 increases at a non-linear rate as the slider is displaced from its neutral position. The greater the displacement of the slider 277 the greater becomes the magnitude of its voltages compared with that developed by the generator 282. Therefore, the rate tracking component of the aided tracking signal increases at a non-linear rate to decrease the time constant of the aided tracking signal as the displacement of the handwheel 18 is increased. The aided tracking signal is connected from lead 283 through switches 249, 251 and 125 to input lead 123 of the azimuth amplifier 121, which controls the variable speed drive as has already been described.

The elevation variable ratio aided tracking is identical with the azimuth tracking control. Handwheel 19 drives shaft 291 which drives through gearing 292 to rotate shaft 293, that is connected by magnetic coupling 294 to shaft 295. The shaft 295 positions slider 296 of potentiometer 297, having its terminals connected to the regulated direct current power supply. Output voltage of potentiometer slider 296 is connected by lead 300 in series with permanent magnet generator 298 that is driven through gearing 299 by the handwheel 19. Variable load for the potentiometer 297 is provided by variable resistor 301 that has slider 302 connected to the slider 296, which is positioned by shaft 295. The midpoint of variable resistor 301 is connected through resistor 303 to ground.

As the handwheel 19 is displaced, the time constant of the aided tracking signal appearing at lead 304 decreases due to the increasing resistance of the variable load for the potentiometer 297. Thus, the magnitude of the rate signal from potentiometer slider 296 increases in non-linear fashion as compared with the voltage developed by generator 298 whereby the ratio of the displacement component to the rate component of the aided tracking signal decreases as the displacement of the handwheel 19 increases.

The lead 304 is connected through switch 268 (Fig. 3b) to switches 269 and 126 to track signal input lead 124 of the amplifier 122 which controls the output of generator 83, that in turn varies the speed of elevation tracking motor 85 to position the tracker in elevation.

The ratio of the displacement and rate components to the aided tracking system depends upon the ratio of the resistance of the potentiometers and variable loads therefor. Suitable values may of course be selected and, if desired, portions of the variable load shorted out to provide linear aided tracking.

Since the position of azimuth and elevation potentiometer sliders 277 and 296 respectively determine the rates of movement of the radio-optical tracker in azimuth and elevation, it is desirable to centralize these potentiometer sliders when they are not in use in order to avoid moving the radio-optical tracker at undesired rates when the switches are closed to control the variable speed drives from the manual tracking handwheels 18 and 19. If the potentiometer sliders were not automatically moved to their central neutral positions, operation of the switches to control the variable speed device from the potentiometers would supply voltages to the variable speed drives which might result in rapid slewing of radio-optical tracking which would be entirely unexpected and might cause damage.

Furthermore, in switching from one of the other tracking circuits to the manual tracking circuits controlled by handwheels 18, 19, the radio-optical tracker might be thrown off of the target if excessive rates were set in due to the position of sliders 277 and 296.

As has already been explained, the handwheel 18 is connected to potentiometer slider 277 through magnetic coupling 275. The coupling 275 is energized from a source of power 279 which supplies a direct current voltage to the potentiometers and is connected to a source of power 341 through a switch 342. The connection between the coupling 275 and the source of power 279 includes a switch 343 which may, if desired, be operated simultaneously in conjunction with gang switches 251, 269, 310, and 316 which are used for switching from manual to automatic tracking. When the magnetic coupling 275 is energized, movements of the handwheel 18 are coupled to shaft 274 and connected directly to shaft 276 which positions potentiometer slider 277. When the coupling is deenergized, shaft 276 is free to move independently of shaft 274 of the handwheel 18. The shaft 276 is at that time centralized by suitable device such as scissors spring 344 which is most clearly shown in Figs. 4 and 5.

Figures 4, 5:
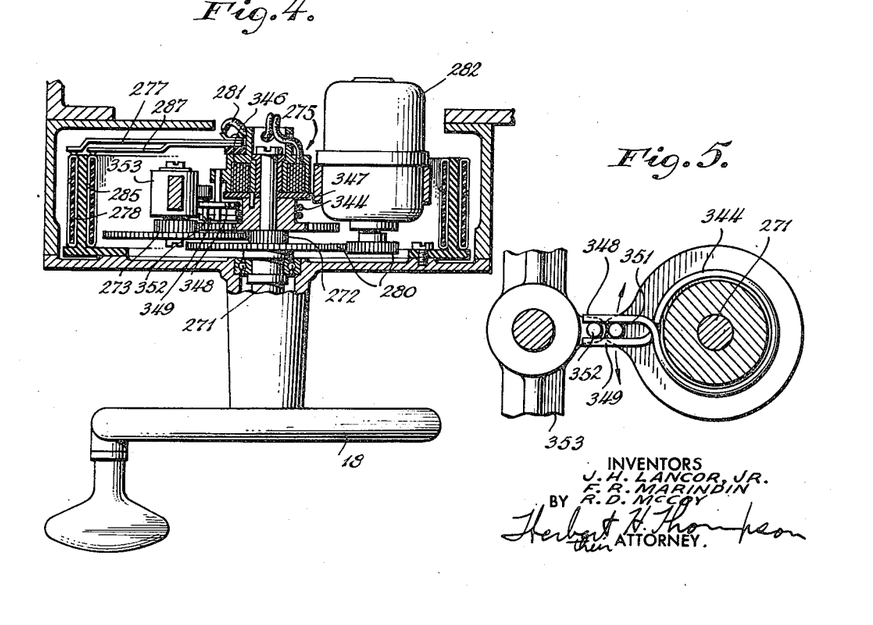
Fig. 4 is an enlarged sectional view of the manual tracking control on the radio-optical tracker.
Fig. 5 is an enlarged, fragmentary, sectional view of the tracking control of Fig. 4.
Figure 5B:
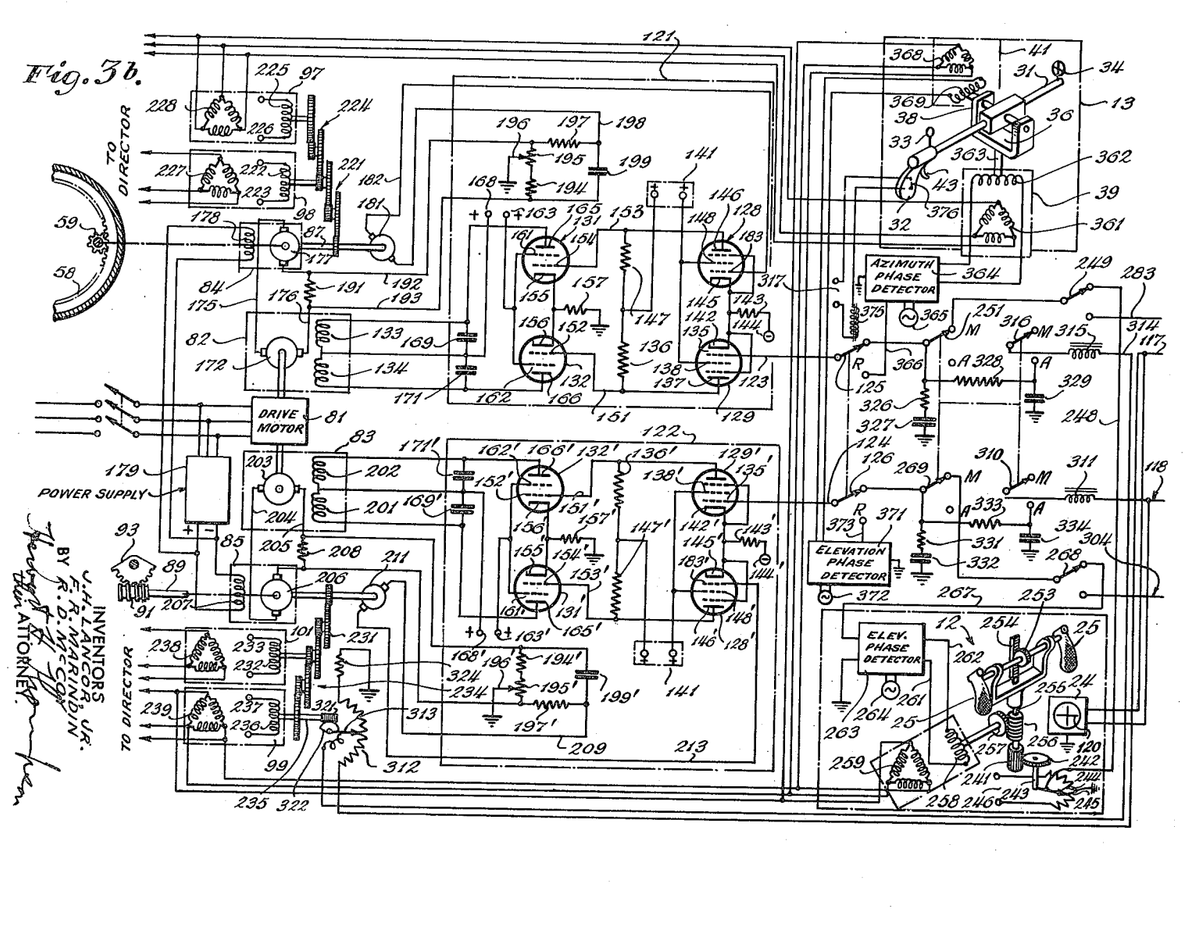

As shown in Fig. 4, the magnetic coupling 275 includes an electromagnet 346 and an armature 347. The armature 347 is driven through the gearing heretofore described, by handwheel 18 whereas the electromagnet 346 is freely rotatable on the shaft 271. When the electromagnet is energized, the armature 347 drives through the electromagnet 346 to position sliders 277 and 287. Projecting fingers 348 and 349 of the scissors spring are arranged on opposite sides of a pin 351 that is secured to the electromagnet 346 and a second pin 352 that is fastened to the support for the handwheel by a suitable bracket 353.

When the electromagnet 346 is deenergized one arm of the scissors spring will act on the pin 351 to return the electromagnet and the sliders 277 and 287 to their central neutral position. It will be apparent from the structure described and illustrated that the potentiometer sliders may be moved in either direction from their central neutral points and returned to their central neutral points on deenergization of the magnet. Thus, when either of the switches 342 or 343 (Fig. 3a) are open, and the electromagnet 346 is deenergized, the scissors spring acts as a centralization device to return the sliders 277 and 287 to their neutral position. This action of the scissors spring avoids introduction of undesired rates when the manual tracking control is connected to the amplifier 121 for the variable speed drive.

The tracking handwheel 19 and its potentiometer centralizing devices are identical with the tracking handwheel 18, as has already been described. Figs. 4 and 5 disclose one arrangement of this tracking device which may be used for both the azimuth and elevation tracking controls. When the magnetic coupling 294 is deenergized by opening switch 342 or switch 355, scissors spring 356 acts on pins 357 and 358 to return the shaft 295 together with sliders 296 and 302 to their central neutral position.

Automatic tracking system

As has already been described, signals from azimuth and elevation sensing circuits 112 and 113 appear at leads 117 and 118 corresponding to the azimuth and elevation displacement of the directivity axis of the antenna relative to the position of the detected object or target. The lead 118 is connected through a choke 311 to switch 310. Voltage of lead 117 is applied across a secant potentiometer 312 having its slider 313 connected by lead 314 to choke 315 which is connected to switch 316.

The azimuth error signal measured by the radio system and appearing on lead 117 corresponds to the displacement of the directivity axis of the antenna relative to the position of the target as measured in a lateral plane including the directivity axis. Since the azimuth angular rate of movement of the directivity axis increases according to the secant of the elevation angle, the azimuth error signal measured in a lateral plane including the directivity axis has a decreasing effect as the elevation angle increases.

This has the result of decreasing the gain of the variable speed azimuth driving system as a function of the secant of the elevation angle. In order to compensate for this change and to provide more uniform tracking, the azimuth error signal determined by the azimuth sensing circuit 112 is multiplied by the secant of the elevation angle. This multiplication is effected by potentiometer 312. The potentiometer is of well known design having a tapered winding varying in a secant function within useful limits which may extend from zero to 80 degrees elevation. Since the secant of ninety degrees is infinite, it is not practical to multiply the secant of the larger angles. The voltage of the slider 313 varies approximately as a secant of the angle through which the slider is moved.

Potentiometer slider 313 is driven from shaft 235 by worm gearing 321 which meshes with a worm wheel sector 322 on the slider 313. The azimuth error signal voltage of lead 117 is connected across the potentiometer 312 and a resistor 324 to ground. Since the secant of zero degrees is unity, the voltage across the resistor 324 serves as the normal azimuth error voltage for zero elevation. From this description it will be apparent that the voltage from potentiometer slider 313 which is connected by lead 314 through choke 315 to switch 316 corresponds to the azimuth error signal multiplied by the secant of the elevation angle.

Switches 251, 269, 310, and 316 are ganged together and are operated simultaneously to switch from manual to automatic tracking. The manual tracking may be accomplished either by the remote searching and target selecting station or the tracking handwheels 18 and 19 on the radio-optical tracker. In either case an error integrating network provides a sustaining error signal during the switching operation from manual to automatic tracking. The integral of the manual tracking signal is supplied to keep the variable speed drives running at substantially the same rate. This rate may be slowly changed by the instantaneous value of the error until the latter signal predominates the manual tracking signal.

The integrating networks for azimuth and elevation signals are substantially the same. The azimuth error integrating network includes a series circuit consisting of resistance 326 and condenser 327 connected between switch 251 and ground and also a resistor 328 connected between switches 251 and 316 as well as a condenser 329 from switch 316 to ground. During manual tracking the condensers 327 and 329 are charged substantially to the voltage of the manual tracking control signal. When the switch 316 is thrown from its manual tracking position (M) to its automatic tracking position (A), the charges on the condensers continue to supply substantially the same voltage to the variable speed drives, thereby maintaining the speed of these drives. The charges on the condensers 327 and 329 are slowly modified by signals from the azimuth sensing circuit 112.

The size of resistor 328 may be large as compared with resistor 326 which combines a small portion of the error signal from the azimuth sensing circuit 112 with the error integral voltage of the condensers 327 and 329 to control the speed of the variable speed drives. This type of circuit attenuates varying error signals and thereby substantially reduces error signals due to velocity.

The elevation error integrating network is identical with that described for the azimuth circuit and includes networks composed of resistor 331 and condenser 332 connected between switch 269 and ground. A resistor 333 is connected between the switches 269 and 310 and condenser 334 is connected between resistor 333 and ground. The resistor 333 may be selected to be several times the resistance of resistor 331 so the voltage of lead 124 comprises an elevation error integral voltage and a small percentage of the instantaneous elevation error signal from the elevation sensing circuit 113.

When the switches 251, 269, 310 and 316 are thrown from their manual positions (M) to their automatic positions (A), the tracking control is switched to automatic operation while preserving the angular tracking rates introduced by the manual tracking controls. These rates continue until they are integrated out by radio error signal connecting errors in the manual tracking signals or introducing new rates to follow the course of the target.

Remote sight

As has already been described, the remote sight 31 is movable in azimuth and elevation and actuates signal generators 39 and 41 in accordance with its movements in azimuth and elevation. Signal generator 39 includes a stator winding 361 that is connected to the stator winding 228 of the azimuth position transmitter. Rotor winding 362 of the signal generator 39 is positioned as by shaft 263 in accordance with the azimuth position of the remote sight 31. With this arrangement a voltage is induced in rotor winding 362 that is displaced in phase according to the displacement between the azimuth position of the radio-optical tracker 11 and the azimuth position of the remote sight 31.

The phase of this voltage represents an error signal corresponding to the difference in the position of the radio-optical tracker and the remote sight. This voltage is supplied to a phase detecting circuit 364 where it is compared in phase to a source of alternating current voltage 365 to produce a direct voltage on output lead 366 proportional to the phase displacement that is dependent upon the magnitude of the displacement between the remote sight and the radio-optical tracker.

A similar circuit for the elevation control includes a stator winding 368 in signal generator 41 that is connected to stator winding 239 of position transmitter 99. The phase of the voltage induced in rotor winding 369 depends therefore upon the elevation displacement between the radio-optical tracker and the remote sight 31. This voltage is supplied to elevation phase detector 371 where it is compared in phase with source of alternating current voltage 372 to produce a voltage on output lead 373 corresponding to the phase displacement, that is, corresponding to the elevation displacement between the radio-optical tracker and the remote sight 31. The output leads 366 and 373 of the azimuth and elevation phase detectors 364 and 371 are connected to one contact of switches 125 and 126, which are operated by a solenoid 375 connected through a series switch 376 to a suitable power source 377. When the trigger 43 is depressed to close switch 376 in the remote sight, switch arms 125 and 126 are moved to their lower contacts "R" which connect the output voltages of leads 366 and 373 to the azimuth and elevation amplifiers 121 and 122. This causes the azimuth and elevation motors to drive in a direction that tends to reduce the azimuth and elevation error signals to zero.

The fire control officer may, by using sight 31, transfer the entire tracking system from one target to another merely by positioning sight 31 so it is on the new target and pressing trigger 43 whereupon the error signals of signal generators 39 and 41 will cause the motors to direct the radio-optical tracker toward the selected target where either the manual or automatic tracking circuits may be used to follow movements of the target when the fire control officer releases the switch 376.

*Operation*

The radio-optical tracker 11 includes radio and optical sighting devices which are positioned simultaneously in azimuth and elevation to search for targets or to follow movements of a selected target. The radio sight detects the presence of targets within its receptivity pattern and determines their displacements relative to its directivity axis. The displacements are determined in the form of error voltages which are used to indicate the targets in their relative position on the screen of indicator 24 in the searching and target selector station 12.

The operator of the searching and target selecting station operates handlebars 25 which position the radio-optical tracker in elevation according to the position of the handlebars about a horizontal axis and cause the tracker to rotate in azimuth at a rate dependent upon the displacement of the handlebar controls about a verical axis. These handlebar controls are manipulated to direct the radio-optical tracker on a selected target, at which time control of the tracker is transferred to operators located on the tracker itself.

These operators may optionally view the indicators 21 and 22 for the radio sight or eyepieces 75 or 76 of the optical sight to determine the displacement of the radio-optical tracker relative to the position of a target. They then manipulate handwheels 18 and 19 which actuate controls to produce variable ratio aided tracking signals for controlling the variable speed drives to direct the radio-optical tracker toward the target. Once the radio-optical tracker is approximately on a selected target it may be switched to automatically follow movements of the target. In automatic tracking, the radio azimuth and elevation error signals are connected to control the variable speed drives for continuously directing the radio-optical tracker toward the target thereby causing it to follow movements of the target.

When the manual tracking controls are disconnected from the circuit, magnetic couplings are deenergized which release potentiometer sliders from the control of the handwheels 18 and 19 and permit operation of centralizing springs for moving the potentiometers to their central neutral positions, thereby avoiding introducing undesired rates when the manual tracking system is again connected to the variable speed drives.

The variable speed drives are all of the electrically controlled type in which the speed of a motor is controlled in accordance with the output of a generator. Stabilization is provided through the expedient of velocity damping and torque rate voltages, which are arranged in a degenerative feedback circuit to oppose fluctuations or changes in the speed as well as the torque of the motor. Speed regulation, particularly at low speeds for variable torques is provided by obtaining a voltage dependent upon the torque of the motor and using this voltage in a regenerative feedback circuit for controlling the amplifier, thereby tending to maintain the speed of the motor constant even though the torque is increased.

When a fire control officer or other officer desires to transfer operation of the radio-optical tracker from one target to another, he sights the desired target with remote sight 31 and depresses trigger 43 which operates switches to connect the variable speed drive to azimuth and elevation error signals from signal generators positioned by the remote sight and connected to the position transmitters of the radio-optical tracker.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A tracking system comprising a sight, a variable speed drive adapted to be controlled by tracking signals for directing said sight toward an object, a position transmitter actuated by said sight for producing a signal corresponding to the position of said sight, a remote sight, a position receiver connected to said transmitter and actuated by said remote sight for producing an error signal corresponding to displacement between said sights, and a switch for transferring control of said variable speed drive between said tracking and error signals.

2. A tracking system comprising a radio sight, a variable speed drive for moving said sight, a manually operable control member, a remote sight, an automatic tracking circuit for connecting said radio sight to said variable speed drive, a manual tracking circuit for connecting said manual control member to said variable speed drive, a remote tracking circuit for connecting said remote sight to said variable speed drive, and switching means for selectively rendering each of said circuits operable.

3. A tracking system comprising a radio sight for producing error signals corresponding to displacement of the axis of said sight relative to a target, a manually operable control member for producing aided tracking signals, a remote tracking control member for producing tracking signals, a remote sighting station for producing error signals corresponding to displacement between said radio sight and said remote sight, an automatic tracking circuit responsive to said radio sight for actuating said variable speed drive according to said error signal, a manual tracking circuit responsive to said manually operable control member for actuating said variable speed drive in accordance with said aided tracking signal, a second manual tracking circuit responsive to said remote tracking member for actuating said variable speed drive according to said tracking signals, a remote tracking circuit responsive to said remote sighting station for actuating said variable speed drive according to said error signal, and switching means for selectively rendering each of said circuits operable.

4. A tracking system comprising a radio sight, a variable speed drive for moving said sight, a manually operable control member, a remote manually operable control member, a remote sighting station, an automatic tracking circuit for connecting said radio sight to automatically control said variable speed drive, a manual tracking circuit for connecting said manually operable control member to control said variable speed drive, a remote manual tracking circuit for connecting said remote manually operable control member to said variable speed drive, a remote tracking circuit for connecting said remote sighting station to control said variable speed drive, and switching means for selectively rendering each of said circuits operable.

5. A tracking system comprising a radio sight movable in azimuth and elevation to track a target, variable speed drive mechanism for moving said sight in azimuth and elevation, manually operable tracking means, a remote sight, an automatic tracking circuit actuated by said radio sight for producing azimuth and elevation error signals, a manual tracking circuit actuated by said manually operable means for producing azimuth and elevation tracking signals, a remote control circuit actuated by said remote sight for producing azimuth and elevation error signals corresponding to displacement between said sights, and switching means for selectively connecting said variable speed drive to said circuits to direct said sight toward said target.

6. Tracking apparatus comprising a base, a support rotatable on said base, a radio sight including a directional antenna and an indicator carried by said support, and an optical sight on said support having a sighting axis substantially coincident with the directivity axis of said antenna and an eyepiece on said support adjacent said indicator.

7. Tracking apparatus comprising a base, a support rotatable on said base, a manually operable control member, mechanism responsive to said control member for rotating said support on said base, a radio sight including a directional antenna and an indicator carried by said support, and an optical sight on said support having a sighting axis substantially coincident with the directivity axis of said antenna and an eyepiece adjacent said indicator whereby the operator of said control member may optionally use said indicator or said eyepiece to direct said axes toward an object.

8. Tracking apparatus comprising a support mounted on a base for rotation about one axis, a radio sight including a directional antenna movable on said support about a second axis and an indicator carried by said support, an optical sight movable on said support having a sighting axis substantially coincident with the directivity axis of said antenna and an eyepiece adjacent said indicator, a pair of control elements, mechanism actuated by one of said control elements for rotating said support about said one axis, mechanism actuated by the other of said control elements for moving said antenna and said optical sight synchronously on said support to simultaneously direct said directivity and sighting axes toward an object.

9. Tracking apparatus comprising a support mounted on a base for rotation about one axis, a radio sight including a directional antenna movable on said support about a second axis and an indicator carried by said support, an optical sight movable on said support having a sighting axis substantially coincident with the directivity axis of said antenna and an eyepiece adjacent said indicator, a pair of control elements, mechanism actuated by one of said control elements for rotating said support about said one axis, mechanism actuated by the other of said control elements for moving said antenna and said optical sight synchronously about said second axis, and an automatic tracking circuit connecting said radio sight to said mechanisms to simultaneously direct said directivity and sighting axes toward an object.

10. Tracking apparatus comprising a support mounted on a base for rotation about one axis, a radio sight including a directional antenna movable on said support about a second axis and an indicator carried by said support, an optical sight movable on said support having a sighting axis substantially coincident with the directivity axis of said antenna and an eyepiece adjacent said indicator, a pair of control members, mechanism for rotating said support about said one axis, mechanism for moving said antenna and said optical sight synchronously on said support about said second axis, automatic tracking circuits for connecting said radio sight to said mechanisms, manual tracking circuits for connecting said members to said mechanisms, and a selector switch for optionally rendering said circuits operative to simultaneously direct said directivity and sighting axes toward an object.

11. Tracking apparatus comprising a radio sight and an optical sight adapted to be used optionally by an operator, and power means controllable by the operator for jointly moving said sights.

12. In tracking apparatus for controlling a sight to follow movements of a target, a variable rate system comprising a member for controlling said sight, a non-linear device actuated by said member for producing a voltage having a non-linear relation to the displacement of said member, and a variable speed drive responsive to said device for driving said sight at a rate corresponding to said voltage.

13. In tracking apparatus for controlling a sight to follow movements of a target, a variable ratio aided tracking system comprising a member for controlling said sight, a non-linear device actuated by said member for producing a voltage having non-linear relation to the displacement of said member, a generator actuated by said member for producing a voltage corresponding to the rate of movement of said member, and a variable speed device responsive to said device and said generator for driving said sight at a rate corresponding to said voltages.

14. In tracking apparatus having a sight to follow movements of a target, a variable rate system comprising a member for controlling said sight, a potentiometer actuated by said member to produce a variable output voltage, a variable load connected to said potentiometer and actuated by said member, and a variable speed drive responsive to said potentiometer for driving said sight at a rate corresponding to said voltage.

15. In tracking apparatus for controlling a sight to follow movements of a target, a variable ratio aided tracking system comprising a member for controlling said sight, a potentiometer actuated by said member, a variable resistance load connected to said potentiometer and actuated by said member for varying the output voltage of said potentiometer in a non-linear relation to the displacement of said member, a generator actuated by said member for producing a voltage corresponding to the rate of movement of said member, and a variable speed drive responsive to said potentiometer and said generator for driving said sight at a rate corresponding to said voltages.

16. An electrical control system comprising a manually operable control member, a non-linear device actuated by said member for producing a voltage having non-linear relation to the displacement of said member, and a variable speed drive responsive to said device for driving an output member at a rate corresponding to said voltage.

17. An electrical control system comprising a manually operable control member, a non-linear device actuated by said member for producing a voltage having a non-linear relation to the displacement of said member, a generator actuated by said member for producing a voltage dependent upon the velocity of said member, and a variable speed device responsive to said non-linear device and said generator for driving an output member at a rate corresponding to said voltages.

18. An electrical control system comprising a manually operable control member, a potentiometer actuated by said member, a variable resistance load connected to said potentiometer and actuated by said member, and a variable speed drive for driving an output member at a rate corresponding to the output of the potentiometer.

19. An electrical control system comprising a manually operable control member, a potentiometer actuated by said member, a variable resistance load connected to said potentiometer for causing the output voltage of said potentiometer to have a non-linear relation to the displacement of said control member, a generator actuated by said control member for producing a voltage corresponding to the rate of movement of said control member, and a variable speed drive actuated by said potentiometer and said generator for driving an output member at a rate corresponding to said voltages.

20. In tracking apparatus, a manually operable tracking control device comprising a handle, a shaft driven by said handle, a second shaft, a magnetic coupling between said shafts, a rate control element actuated by said second shaft, and a centralizing device for moving said second shaft and said element independently of said handle and said first shaft to a neutral position upon de-energization of said magnetic coupling.

21. In tracking apparatus, a manually operable tracking control device comprising a handle, a shaft driven by said handle, a second shaft, a magnetic coupling between said shafts, a rate control device actuated by said second shaft, a circuit for supplying energy to said coupling, a switch in said circuit, and a centralizing device for moving said second shaft and said element independently of said handle to a neutral position upon operation of said switch to de-energize said coupling.

22. In tracking apparatus, a manually operable tracking control device comprising a handle, a shaft driven by said handle, a second shaft, a magnetic coupling between said shafts, a circuit for supplying energy to said coupling, a potentiometer having a slider positioned by said second shaft, a circuit for supplying power to said potentiometer, means operable upon shutting off said power means for opening the supply circuit for said magnetic coupling, and a centralizing device for moving said second shaft and said slider independently of said handle to a neutral position upon de-energization of said coupling.

23. In tracking apparatus, a sight movable about two independent axes, a tracking member, mechanism actuated by movement of said member in one direction for displacing said sight about one axis according to the displacement of said member, and a mechanism actuated by movement of said member in another direction for moving said sight at a rate dependent upon the displacement of said member.

24. In tracking apparatus, a sight movable in elevation and azimuth about two independent axes, a tracking member movable about two axes, mechanism actuated by movement of said member about one of said axes for displacing said sight in elevation according to the displacement of said member, and mechanism actuated by movement of said member about the other of said axes for moving said sight in azimuth at a rate dependent upon the displacement of said member.

JOSEPH H. LANCOR, JR.
FREDERICK R. MARINDIN.
RAWLEY D. McCOY.

REFERENCES CITED

The following references are of record in the file of this patent:

UNITED STATES PATENTS

| Number | Name | Date |
|---|---|---|
| 286,833 | Levy | Oct. 16, 1883 |
| 1,684,138 | Nixdorff | Sept. 11, 1928 |
| 1,737,079 | Elliott | Nov. 26, 1929 |
| 1,775,399 | Kent | Sept. 9, 1930 |
| 1,883,802 | Lamson | Oct. 18, 1932 |
| 1,959,264 | Dugan | May 15, 1934 |
| 1,990,494 | Murphy | Feb. 12, 1935 |
| 2,014,534 | Lutomirski | Sept. 17, 1935 |
| 2,231,929 | Lyman | Feb. 18, 1941 |
| 2,308,936 | Schuchardt et al. | Jan. 19, 1943 |